United States Patent
Koo et al.

(10) Patent No.: US 8,681,678 B2
(45) Date of Patent: Mar. 25, 2014

(54) METHOD OF TRANSMITTING MULTICAST AND BROADCAST SERVICE DATA

(75) Inventors: Ja Ho Koo, Seoul (KR); Wook Bong Lee, Sungnam-si (KR); Dong Cheol Kim, Suwon-si (KR); Bin Chul Ihm, Seoul (KR); Hyun Soo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 12/920,171

(22) PCT Filed: Mar. 2, 2009

(86) PCT No.: PCT/KR2009/000999
§ 371 (c)(1),
(2), (4) Date: Nov. 23, 2010

(87) PCT Pub. No.: WO2009/108026
PCT Pub. Date: Sep. 3, 2009

(65) Prior Publication Data
US 2011/0058512 A1    Mar. 10, 2011

Related U.S. Application Data

(60) Provisional application No. 61/032,428, filed on Feb. 29, 2008, provisional application No. 61/033,400, filed on Mar. 3, 2008.

(30) Foreign Application Priority Data

Aug. 20, 2008    (KR) .................. 10-2008-0081316

(51) Int. Cl.
*H04H 1/00*    (2006.01)
*G08C 17/00*    (2006.01)

(52) U.S. Cl.
USPC ........... 370/312; 370/329; 370/311; 370/342; 370/389; 370/310; 455/436; 455/432.2; 455/423

(58) Field of Classification Search
USPC ......... 370/312, 329, 311, 342, 389, 331, 310; 455/436, 432.2, 423
See application file for complete search history.

(56) References Cited

U.S. PATENT DOCUMENTS

| 2007/0105557 A1 | 5/2007 | Israelsson et al. | |
|---|---|---|---|
| 2007/0253367 A1* | 11/2007 | Dang et al. ..................... | 370/329 |
| 2008/0056219 A1* | 3/2008 | Venkatachalam ............ | 370/342 |
| 2008/0175237 A1* | 7/2008 | Kim .............................. | 370/389 |
| 2009/0303918 A1* | 12/2009 | Ma et al. ....................... | 370/315 |

FOREIGN PATENT DOCUMENTS

KR    2007-0067284    6/2007

OTHER PUBLICATIONS

*International Search Report and Written Opinion of the International Searching Authority* from the PCT dated Oct. 9, 2009 in a counterpart PCT application.

\* cited by examiner

*Primary Examiner* — Charles C Jiang
*Assistant Examiner* — Jamal Javaid
(74) *Attorney, Agent, or Firm* — Morgan, Lewis & Bockius LLP

(57) ABSTRACT

A resource allocation method for a Multicast and Broadcast Service (MBS) and a method for transmitting MBS data in a wireless access system are disclosed. The MBS transmission method for a multicast broadcast single frequency network (MBSFN) zone includes, constructing a resource zone by sequentially allocating predetermined symbol areas preferentially on a frequency axis, mapping predetermined MBSs provided from the MBSFN zone to the predetermined symbol areas, and transmitting a first MBS among the predetermined MBSs to mobile stations located at an edge of the MBSFN zone. The first MBS is equal to a second MBS among MBSs provided from a neighbor MBSFN zone. The first MBS and the second MBS are transmitted to the same time zone according to a time division multiplexing (TDM) method.

17 Claims, 10 Drawing Sheets

METHOD OF TRANSMITTING MULTICAST AND BROADCAST SERVICE DATA

The present application is a national stage of PCT International Application No. PCT/KR2009/00999, filed Mar. 2, 2009, and claims the benefit of U.S. Provisional Application No. 61/032,428, filed Feb. 29, 2008, and U.S. Provisional Application No. 61/033,400, filed Mar. 3, 2008. The present national stage application also claims the benefit of Korean Patent Application No. 10-2008-0081316, filed Aug. 20, 2008.

TECHNICAL FIELD

The present invention relates to a resource allocation method for a Multicast and Broadcast Service (MBS) and a method for transmitting MBS data, in a wireless access system.

BACKGROUND ART

A Multicast and Broadcast Service (MBS) will hereinafter be described in detail.

A system for providing the MBS includes an MBS media server, an MBS distribution server, at least one base station (BS), and at least one mobile station (MS).

In this case, the mobile station (MS) is a generic term of electronic appliances capable of wirelessly communicating with the base station (BS). The mobile station (MS) may include all kinds of devices having mobility, for example, a mobile station, a mobile terminal and a user equipment (UE). The MBS media server provides base stations (BSs) with MBS data, and performs MS authentication (or UE authentication) for MBS media or encryption key distribution. The MBS distribution server schedules MBS data applied to several base stations (BSs). Optionally, the MBS distribution server may be omitted or the MBS media server may schedule the MBS data. The base station (BS) receives MBS data over a backbone network, and provides the MS or UE with the MBS data via a wireless interface. In this case, the mobile station (MS) may receive the MBS data from the base station (BS).

The MBS for use in the above-mentioned conventional MBS system can be mainly classified into first and second MBS service types. The first MBS service type is a single-BS access scheme, which is capable of being provided by a single BS within a single cell. The second MBS service type is a multi-BS access scheme, which enables several BSs to construct one MBS zone, such that the BSs provide the same MBS.

For example, the single-BS access scheme enables one BS to equally give all mobile stations (MSs), which desire to receive MBS data, an arbitrary CID from among connection IDs (CIDs) allocated to a multicast, such that the BS is able to transmit the MBS data to the mobile stations (MSs). The multi-BS access scheme enables several base stations (BSs) contained in one MBS zone to provide mobile stations (MSs) with a multicast service using the same multicast CID.

The multi-BS access scheme provides several cells contained in the same MBS zone with the same MBS. Therefore, although a mobile station (MS) moves from one cell to another cell in one MBS zone, the mobile station (MS) can receive the MBS without a handover. That is, the mobile station (MS) based on the aforementioned multi-BS access scheme can acquire service continuity and a macro-diversity gain.

DISCLOSURE

Technical Problem

A multi-cell multicast broadcast single frequency network (MBSFN) system allows a plurality of base stations (BSs) to form a single MBS zone. That is, this MBSFN system enables several base stations (BSs) to simultaneously transmit the same MBS data via the same one frequency.

In this case, as minimum requirements for the MBSFN, a wireless access system requires a coverage of 95%, which preferably satisfies a packet error rate (PER) of 1%. At this time, a quality of service (QoS) provided from the entire MBSFN zone may be deteriorated by a small number of mobile stations which are unable to satisfy the PER of 1%. Most mobile stations incapable of satisfying the PER of 1% are located at an edge of the MBSFN zone. Due to this MBSFN zone edge problem, an overall MBSFN performance may be seriously deteriorated.

Accordingly, the present invention is directed to a method for transmitting multicast and broadcast service (MBS) data that substantially obviates one or more problems due to limitations and disadvantages of the related art.

An object of the present invention devised to solve the problem lies on a method for effectively transmitting MBS data.

Another object of the present invention devised to solve the problem lies on a resource allocation method for an MBS, differently from a conventional resource allocation method for a unicast.

A further object of the present invention devised to solve the problem lies on a new MBS subchannelization method and a method for effectively transmitting MBS data to a mobile station located at the MBS zone edge.

Technical Solution

In order to solve the above-mentioned problems, the present invention provides a variety of resource allocation methods and a method for transmitting MBS data.

The object of the present invention can be achieved by providing a multicast and broadcast service (MBS) transmission method for use in a multicast broadcast single frequency network (MBSFN) zone, the method including: constructing a resource zone by sequentially allocating predetermined symbol areas when resources are first allocated to a frequency axis; mapping predetermined MBSs provided from the MBSFN zone to the predetermined symbol areas; and transmitting a first MBS among the predetermined MBSs to mobile stations located at an edge of the MBSFN zone, wherein the first MBS is equal to a second MBS among MBSs provided from a neighbor MBSFN zone, and the first MBS and the second MBS are transmitted to the same time zone according to a time division multiplexing (TDM) method.

Different MBSs among the MBSs provided from the MBSFN zone and other MBSs provided from the neighbor MBSFN zone may be optionally provided to the mobile stations.

Different MBSs among the MBSs provided from the MBSFN zone and other MBSs provided from the neighbor MBSFN zone may not be provided to the mobile stations.

The predetermined MBSs may be sequentially mapped to the resource zone using predetermined consecutive resource blocks.

The predetermined MBSs may be mapped to the resource zone using a symbol offset value and predetermined consecutive resource blocks.

The first MBS and the second MBS may be provided to the mobile stations using the same symbol offset value.

The first MBS and the second MBS may be mapped by the same permutation.

The predetermined MBSs may be mapped to the resource zone using different permutations for individual MBSs.

The predetermined MBSs may be mapped to the resource zone using different permutation in units of a symbol area.

The predetermined MBSs may be mapped to the resource zone using the time division multiplexing (TDM) method.

Advantageous Effects

The present invention has the following effects.

First, the present invention can effectively provide mobile stations with MBS data.

Second, the present invention uses the resource allocation method for the MBS, in particular, it allocates MBS data according to a TDM scheme, such that it can avoid generating an interference caused by the MBS provided from another MBSFN zone.

Third, the present invention may selectively transmit MBS data to mobile stations located at an edge of the MBSFN zone, such that it can reduce an interference generated from a neighbor MBSFN zone and prevent performance deterioration.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
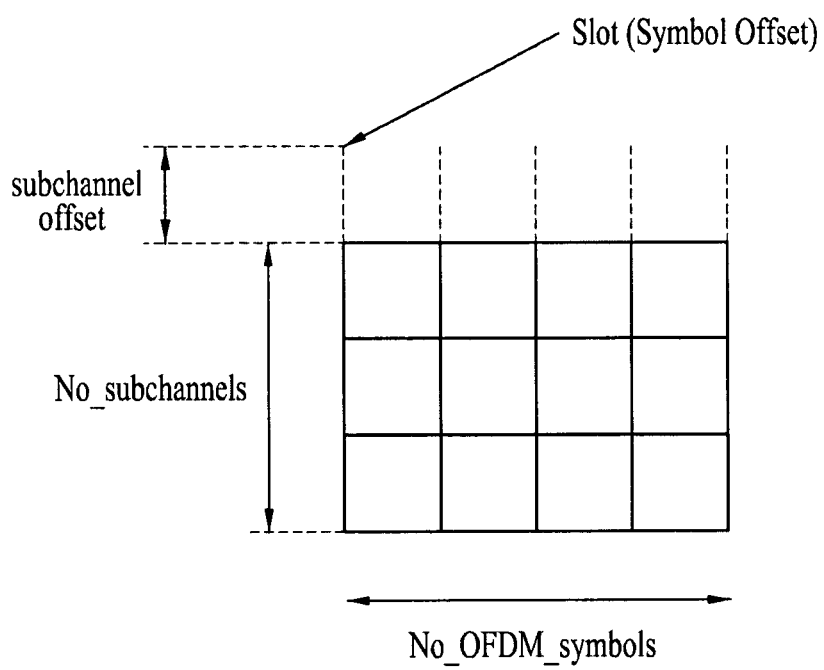
FIG. 1 is a conceptual diagram illustrating a data zone allocation method for use in an IEEE 802.16 system used as one of wireless access systems.

Reference will now be made in detail to the preferred embodiments of the present invention, examples of which are illustrated in the accompanying drawings.

The present invention relates to a method for transmitting MBS data in a wireless access system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the following detailed description of the appended drawings, procedures or steps, which may make vague the inventive features of the present invention, will herein be omitted for the convenience of description, and other procedures or steps well known to those skilled in the art will also be omitted.

The following embodiments of the present invention are disclosed on the basis of a data communication relationship between a base station (BS) and a mobile station. In this case, the base station (BS) is used as a terminal node of a network via which the base station (BS) can directly communicate with the mobile station. Specific operations to be conducted by the base station (BS) in the present invention may also be conducted by an upper node of the base station (BS) as necessary.

In other words, it will be obvious to those skilled in the art that various operations for enabling the base station (BS) to communicate with a mobile station in a network composed of several network nodes including the base station will be conducted by the base station (BS) or other network nodes other than the base station (BS). The term "Base Station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

Also, a transmitter is a node for transmitting data or voice service, and a receiver is a node for receiving data or voice service. Therefore, in case of an uplink, the mobile station may serve as a transmitter, and the base station (BS) may serve as a receiver. Likewise, in case of a downlink, the mobile station may serve as a receiver, and the base station (BS) may service as a transmitter.

On the other hand, a mobile station for use in the present invention may be a personal digital assistant (PDA), a cellular phone, a personal communication service (PCS) phone, a global system for mobile (GSM) phone, a wideband CDMA (WCDMA) phone, a mobile broadband system (MBS) phone, or the like.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents. Specifically, the embodiments of the present invention may be supported by IEEE 802.16e-2004, IEEE 802.16e-2005, and IEEE 802.16 Rev2 standard documents.

Prior to describing the present invention, it should be noted that specific terms disclosed in the present invention are proposed for the convenience of description and better understanding of the present invention, and the use of these specific terms may be changed to another format within the technical scope or spirit of the present invention.

A variety of subchannelization methods for use in the following embodiments of the present invention will hereinafter be described in detail.

FIG. 1 is a conceptual diagram illustrating a data zone allocation method for use in an IEEE 802.16 system used as one of wireless access systems.

Referring to FIG. 1, one slot is constructed in an orthogonal frequency division multiple access (OFDMA) physical layer (PHY layer) in a time and frequency dimension (or subchannel dimension). The OFDMA slot may be defined in different ways according to OFDMA symbol structures. For example, a downlink (DL) full usage of subchannel (FUSC) or a downlink (DL) optional FUSC according to a distributed subcarrier permutation may define one slot, which includes one subchannel (=48 subcarriers) and one OFDM symbol.

A downlink (DL) partial usage of subchannel (PUSC) based on the distributed subcarrier permutation may define one slot, which includes one subchannel (=24 subcarriers) and 2 OFDM symbols. An uplink (UL) partial usage of subchannel (PUSC) based on the distributed subcarrier permutation may define one slot, which includes one subchannel (=24 subcarriers) and 3 OFDM symbols. In this case, a neighbor subcarrier permutation may define one slot, which includes one subchannel (e.g., 24, 16, or 8 subcharriers) or 2, 3 or 6 OFDM symbols.

A data region (or data zone) for the OFDMA scheme may include two-dimensional (2D) allocation of consecutive OFDMA symbols and consecutive subchannels. At this time, all the resource allocations are indicative of logical subchannels.

Figure 2:
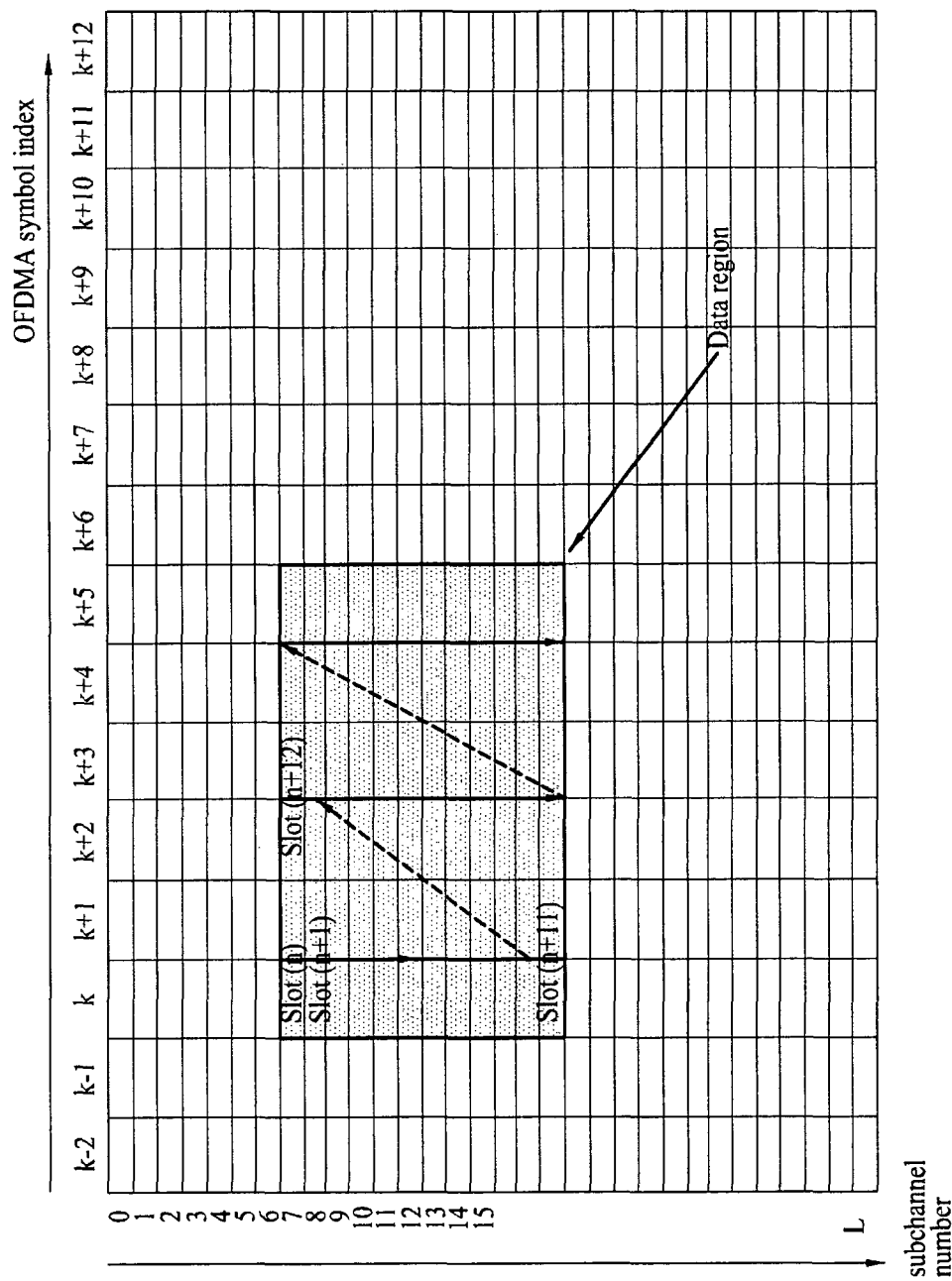
FIG. 2 is a conceptual diagram illustrating a method for mapping an OFDMA slot to a subchannel and symbol in a downlink.

FIG. 2 is a conceptual diagram illustrating a method for mapping an OFDMA slot to a subchannel and symbol in a downlink.

Referring to FIG. 2, it can be easily recognized that a data zone is constructed by a two-dimensional allocation of OFDMA symbols and subchannels. At this time, a horizontal axis of FIG. 2 represents OFDMA symbol indexes, and a vertical axis represents numbers of respective subchannels.

A permutation zone means the number of consecutive OFDMA symbols in a DL or UL based on the same permutation formula. A downlink (DL) subframe or an uplink (UL) subframe may include one or more permutation zones. Media Access Control (MAC) data may be mapped to a DL or UL data zone using the following method.

For example, in case of a downlink (DL), data is segmented into a plurality of blocks, each of which has the size appropriate for one OFDMA slot. Next, respective slots are spaced apart from each other by one subchannel on a subchannel axis (i.e., a frequency axis), and are spaced apart from each other by a span corresponding to one or more OFDMA symbols on a time axis. A slot having the lowest number (i.e., the lowest-numbered slot) is mapped to an OFDMA symbol having the lowest number (i.e., the lowest-numbered OFDMA symbol) and a subchannel having the lowest number (i.e., the lowest-numbered subchannel). In this way, the OFDMA subchannel index gradually increases and at the same time this mapping operation is continued. If the mapping position reaches the end of the data zone, the above-mentioned mapping operation is continued from the lowest-numbered slot of the next available OFDMA symbol.

Subchannel allocation in a downlink (DL) may be classified into two allocation methods, i.e., a partial usage of subchannels (PUSC) method and a full usage of subchannels (FUSC) method. An OFDMA frame includes multiple zones (multi-zone), for example, PUSC, FUSC, optional FUSC, AMC, etc. The conversion among zones may appear in a "DL_MAP" of a "STC_DL_Zone IE".

Figure 3:
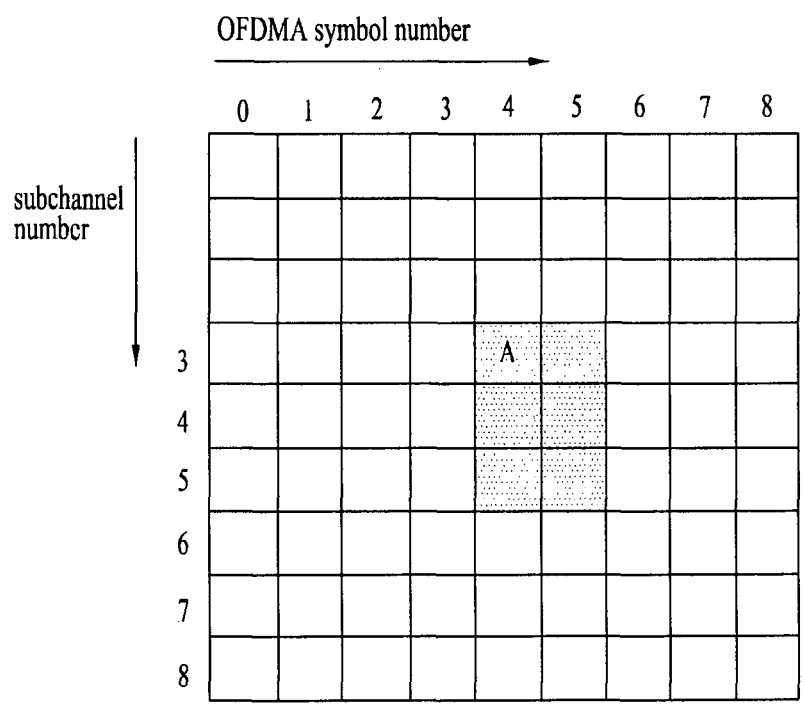
FIG. 3 is a conceptual diagram illustrating a method for allocating a data zone in a downlink.

FIG. 3 is a conceptual diagram illustrating a method for allocating a data zone in a downlink.

When deciding a data zone in a unicast, two resource allocation methods may be used, for example, a first resource allocation method for preferentially carrying out resource allocation on a frequency axis (subchannel numbers), and a second resource allocation method for preferentially carrying out resource allocation on a time axis (OFMA symbol numbers).

A downlink (DL) resource allocation rule for use in the IEEE 802.16 system used as one of wireless access systems is as follows. The DL resource allocation may be defined by an OFDM symbol offset, the number of OFDM symbols, a subchannel offset, and the number of subchannels.

Referring to FIG. 3, a data zone (A) may be defined by the OFDM symbol offset (=4), the number of OFDM symbols (=2), the subchannel offset (=3), and the number of subchannels (=3).

Figure 4:
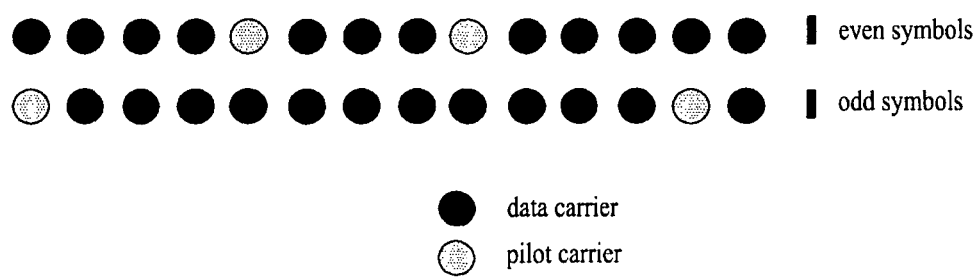
FIG. 4 shows an example of a cluster structure.

FIG. 4 shows an example of a cluster structure.

Subchannel permutations for use in the IEEE 802.16 system may be generally classified into an adjacent subchannel permutation (adjacent subcarrier permutation) and a distributed subchannel permutation (distributed subcarrier permutation). The adjacent subcarrier permutation is used as a permutation method for enabling a logical channel and a physical channel to have the same subcarrier arrangement.

Figure 5:
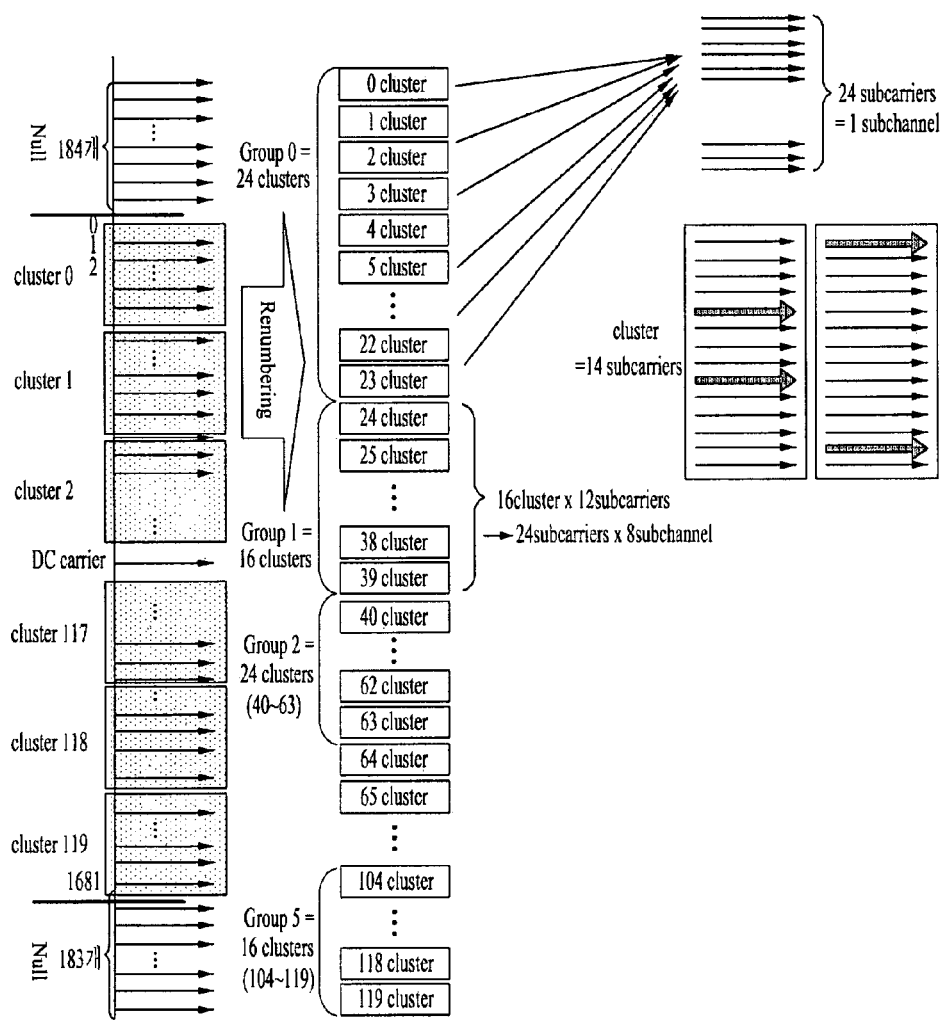
FIG. 5 is a conceptual diagram illustrating a method for generating a subchannel using a PUSC in a downlink.

FIG. 5 is a conceptual diagram illustrating a method for generating a subchannel using a PUSC in a downlink.

A downlink (DL) PUSC based on the distributed subcarrier permutation is as follows. A symbol structure includes pilots, and data and zero subcarriers. The symbol is first divided into a basic cluster and zero carriers. In this case, pilots and carriers are allocated to respective clusters.

Subcarrier allocation to a subchannel may be carried out as follows. First, each subcarrier is divided into $N_{cluster}$ physical clusters each including 14 adjacent subcarriers (also called 14 neighbor subcarriers). Here, $N_{cluster}$ may be changed to another according to Fast Fourier Transform (FFT) sizes. The following equation 1 represents a method for generating the logical cluster.

[Equation 1]

$$LogicalCluster = \begin{cases} RenumberingSequence(PhysicalCluster) & \text{First } DL \text{ zone, } orUse \text{ All } SC \text{ indicator} = \\ & (\text{inSTC\_DL\_ZONE\_IE} \\ RenumberingSequence(((PhysicalCluster) + & \text{Otherwise} \\ 13 \cdot DL\_PermBase) \bmod Nclusters) \end{cases}$$

Referring to Equation 1, the number of a physical cluster is renumbered as the number of a logical cluster. Subsequently, the logical cluster is allocated to each group. In this case, it is preferable that at least one group is allocated to at least one segment. Finally, subcarriers contained in each major group are allocated to a subchannel.

Referring to FIG. 5, pilot carriers are firstly allocated to each cluster, and the remaining data carriers are then allocated to the cluster. This allocation may be independently applied to respective OFDMA symbols. Each subchannel may include subcarriers generated from each group. Therefore, the number of groups may be equal to the number ($N_{subcarrier}$) of subcarriers per subchannel. Also, the number of subcarriers per group may be equal to the number ($N_{subchannel}$) of subchannels. Accordingly, the number of data subcarriers is represented by $N_{subcarrier} \times N_{subchannel}$.

The following equation 2 represents a permutation formula for properly dividing subcarriers into subchannels.

$$\text{subcarrier}(k,s) = N_{subchannels} \cdot n_k + \{p_s[n_k \bmod N_{subchannels}] + DL\_PermBase\} \bmod N_{subchannels} \quad \text{[Equation 2]}$$

where
- subcarrier(k,s) is the subcarrier index of subcarrier k in subchannel s
- s is the index number of a subchannel, from the set [0 ... $N_{subchannels}$−1]
- $n_k$ is (k+13·s)mod $N_{subchannels}$ where k is the subcarrier-in-subchannel index from the set [0 ... $N_{subcarriers}$−1]
- $N_{subchannels}$ is the number of subchannels (for PUSC, use number of subchannels in the currently partitioned major group)
- $p_s[j]$ is the series obtained by rotating basic permutation sequence cyclically to the left s times
- DL_PermBase is an integer ranging from 0 to 31, which is set to preamble IDCell in the first zone and determined by the DL_MAP for other zones In Equation 2, s is the index number of a subchannel, and $n_k$ is k+13s) mod $N_{subcarrier}$. $N_{subcarrier}$ is the number of subcarriers. $p_s[j]$ is the series obtained by cyclically rotating a basic permutation sequence to the left s times. DL_PermBase is any one of integers ranging from 0 to 31, which is set to a preamble IDcell in a first zone and is determined by the DL_MAP for other zones.

For example, if an FFT size is 2048, a subcarrier is divided into subchannels using a basic permutation sequence 12 (=6, 9,4,8,10,11,5,2,7,3,1,0) in regard to an even group. Otherwise, in regard to an odd group, a subcarrier is divided into subchannels using a basic permutation sequence 8 (=7,4,0,2, 1,5,3,6).

Figure 6:
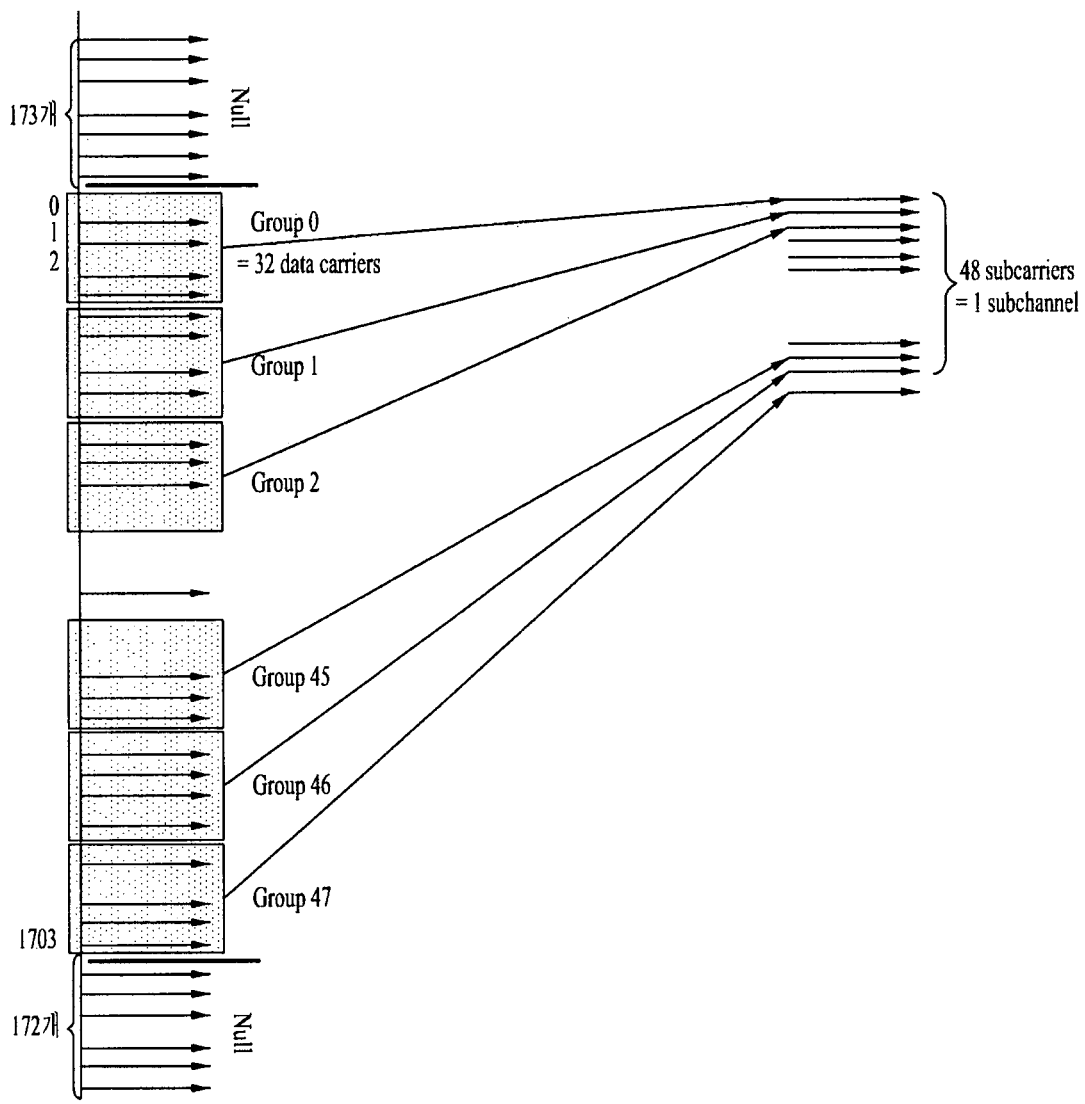
FIG. 6 is a conceptual diagram illustrating a method for generating a subchannel using an FUSC in a downlink.

FIG. 6 is a conceptual diagram illustrating a method for generating a subchannel using an FUSC in a downlink.

In the FUSC, each subchannel includes 48 subcarriers. Each subchannel includes the remaining data subcarriers (48*32=1536), except for zero subcarriers and pilots. After the mapping of all pilots is carried out, the remaining data subcarriers may be allocated by Equation 2.

When applying a permutation in a PUSC or FUSC, the rate of collision (i.e., a hit rate) between different data or services is reduced by other permutation bases, such that the probability of collision can also be reduced.

A resource zone allocation method for use in the 3GPP LTE system used as one of wireless access systems will hereinafter be described in detail.

Figure 7:
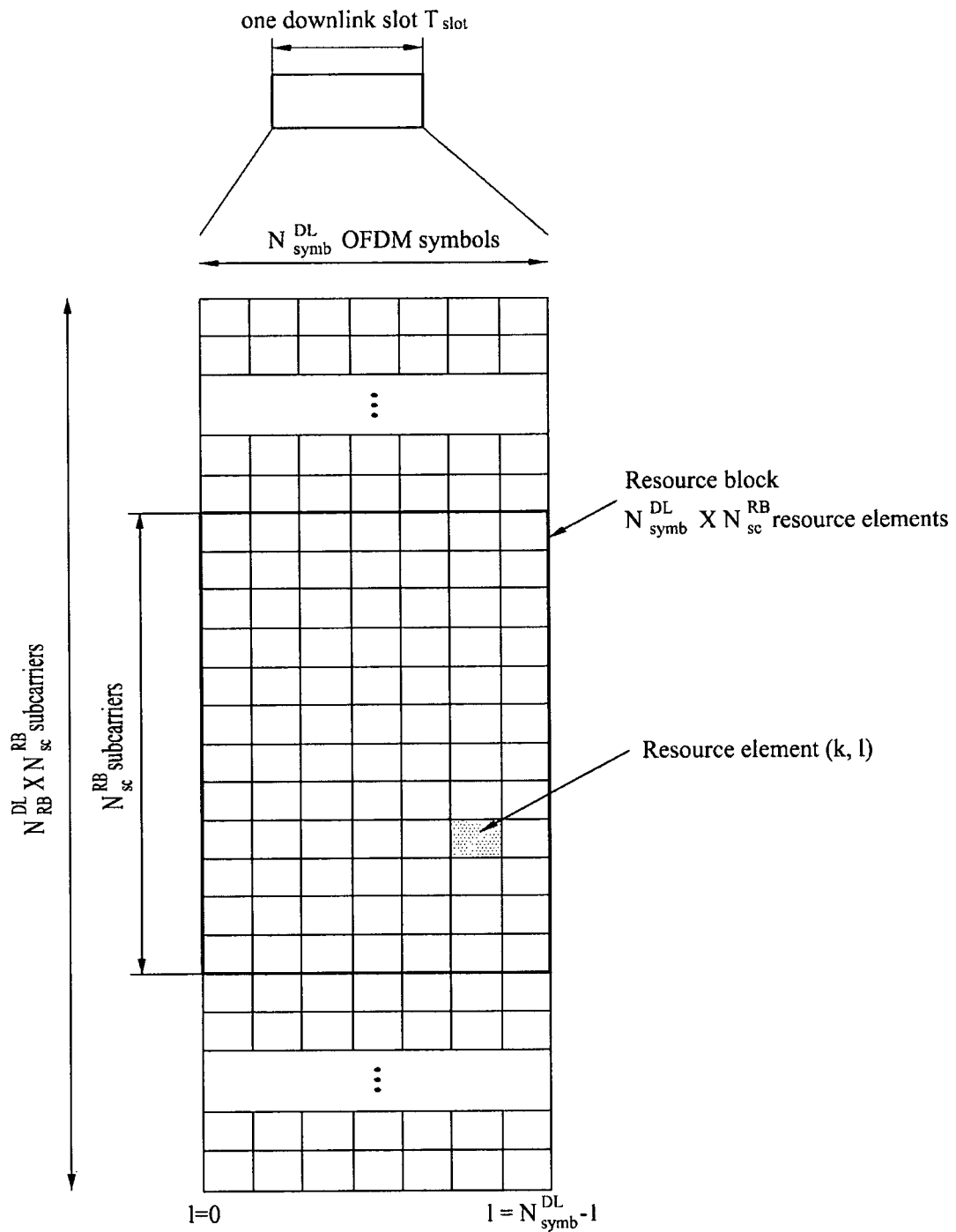
FIG. 7 is a conceptual diagram illustrating a method for allocating a downlink resource zone.

FIG. 7 is a conceptual diagram illustrating a method for allocating a downlink resource zone.

Referring to FIG. 7, one resource block (RB) may be represented by $N_{symb}^{DL} \times N_{SC}^{RB}$, where $N_{symb}^{DL}$ is the number of OFDM symbols contained in a frame or subframe, and $N_{SC}^{RB}$ is the number of subcarriers contained in a resource block (RB).

A signal transferred to each slot may be represented by one resource grid which includes $N_{RB}^{DL} \times N_{SC}^{RB}$ subcarriers and $N_{symb}^{DL}$ OFDM symbols. The size of $N_{RB}^{DL}$ may be changeable with a downlink bandwidth. In this case, the size of $N_{RB}^{DL}$ is located in the range from 6 to 110, as represented by $6 \leq N_{RB}^{DL} \leq 110$.

The following Table 1 represents the number of OFDM symbols depending on both a cyclic prefix (CP) length and a subcarrier spacing.

TABLE 1

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The number of OFDM symbols in one slot is determined by a CP length and a subcarrier spacing as shown in Table 1. In multi-antenna transmission, there may be one resource grid for each antenna port.

Each element contained in a resource grid of an antenna port p is called a resource element, and may also be represented by an index pair (k,l) in one slot (where k=0, . . . , $N_{RB}^{DL} N_{SC}^{RB} - 1$ and l=0, . . . , $N_{symb}^{DL} - 1$).

A physical resource block (RB) may be defined by consecutive $N_{symb}^{DL}$ OFDM symbols of a time domain and consecutive $N_{SC}^{RB}$ subcarriers of a frequency domain. One physical resource block (RB) may include one slot of a time domain and $N_{symb}^{DL} \times N_{SC}^{RB}$ resource elements corresponding to 180 kHz of a frequency domain. A relationship between the number ($n_{PRB}$) of physical resource blocks (RBs) in one slot and the resource element (k,l) can be represented by the following equation 3.

$$n_{PRB} = \left\lfloor \frac{k}{N_{SC}^{RB}} \right\rfloor \qquad \text{[Equation 3]}$$

Figure 8:
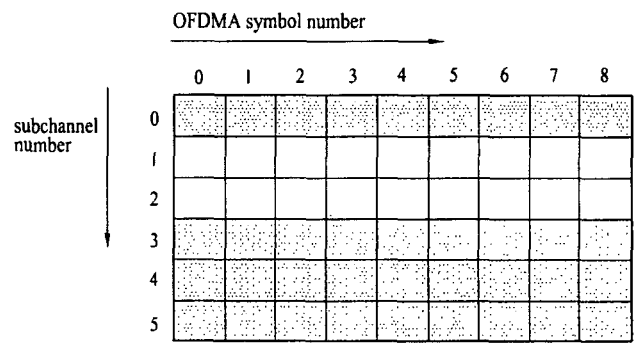
FIG. 8 is a conceptual diagram illustrating an example of a downlink resource allocation method based on a bitmap.

FIG. 8 is a conceptual diagram illustrating an example of a downlink resource allocation method based on a bitmap.

Referring to FIG. 8, a virtual resource block has the same size as that of a physical resource block. Virtual resource blocks are classified into virtual resource blocks of a distributed type and other virtual resource blocks of a localized type.

Virtual resource blocks are mapped to physical resource blocks in order of diversity. For a second-order diversity, one virtual resource block is mapped to one physical resource block. A virtual-to-physical resource block is mapped to two slots of one subframe in different ways.

In the 3GPP LTE system, a distributed type divides one resource block (RB) allocated to one mobile station into two parts. The two parts are allocated to physical resource blocks of different zones, respectively. In the 3GPP LTE system, DL resource allocation is a bitmap style based on the RB number. FIG. 8 shows an exemplary case in which a data zone is defined as a bitmap '100111' on the basis of a subchannel.

Figure 9:
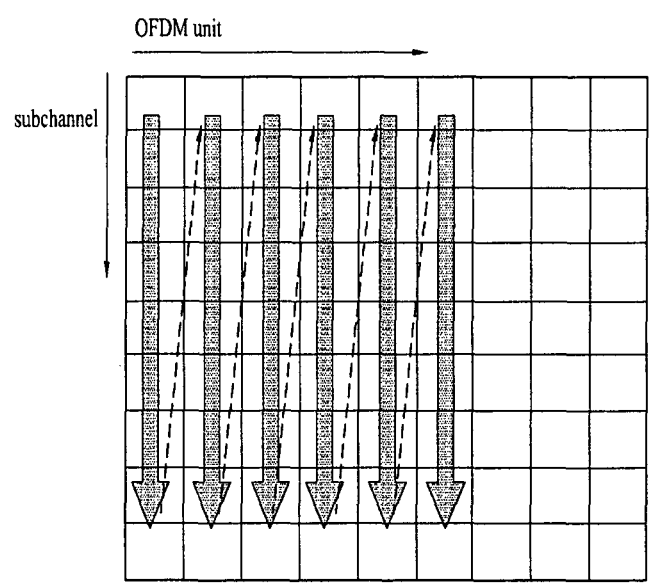
FIG. 9 is a conceptual diagram illustrating an example of a resource allocation method according to one embodiment of the present invention.

FIG. 9 is a conceptual diagram illustrating an example of a resource allocation method according to one embodiment of the present invention.

One embodiment of the present invention describes a resource allocation method for preferentially allocating an MBS data zone to a frequency axis. In order to reduce performance deterioration of each MBS provided to a mobile station within the range of an MBSFN zone edge providing different multicast and broadcast services (MBSs), the embodiment of the present invention is able to provide each MBS using a Time Division Multiplexing (TDM) scheme.

Referring to FIG. 9, in case of allocating a resource zone for the MBS, this resource zone is preferentially allocated to a frequency axis. A predetermined subchannel is firstly allocated so that a resource zone can be configured. Predetermined resources are allocated to the frequency axis, and the resource zone is then allocated to the next OFDM symbol. In this way, a resource zone having a user-desired size can be allocated.

That is, a resource zone is preferentially allocated to the frequency axis, such that the TDM scheme can be applied to the MBS. The resource zone is preferentially allocated to the frequency axis, and then the OFDM symbol areas are sequentially allocated. Therefore, interference among different MBSFN zones can be effectively prevented by a TDM for each MBS.

Figure 10:
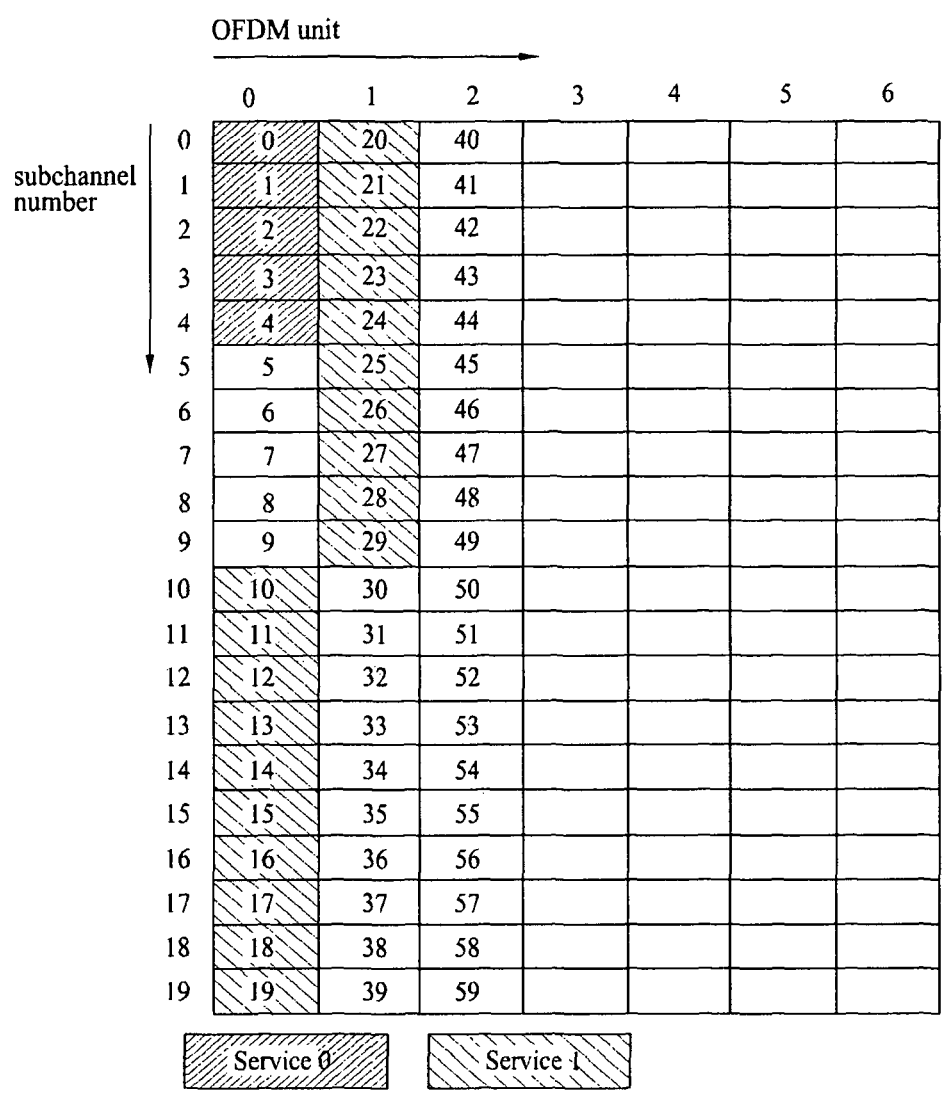
FIG. 10 is a conceptual diagram illustrating an example of a method for numbering MBS resource zones during a resource allocation according to another embodiment of the present invention.

FIG. 10 is a conceptual diagram illustrating an example of a method for numbering MBS resource zones during a resource allocation according to another embodiment of the present invention.

Referring to FIG. 10, a resource numbering can be performed as the RB number gradually increases on a frequency axis. A data region (i.e., data zone) for the MBS can be represented by an offset and consecutive RBs (e.g., duration). Also, the data zone for the MBS may also be represented by only the duration.

Referring to FIG. 10, a 'Service 0' may be represented by an offset(=0) and a duration(=5), and a 'Service 1' may be represented by an offset(=10) and a duration(=20). In other words, 'Service 0' is assigned a first OFDM symbol of the resource zone and 5 subchannels from a first subchannel, and 'Service 1' is assigned 20 subchannels from an 11th subchannel of the first OFDM symbol.

The resource zone allocation method shown in FIG. 10 is differently applied to an IEEE 802.16 system and an LTE system. Here, the IEEE 802.16 system uses an OFDM symbol offset, the number of OFDM symbols, a subchannel offset, and the number of subchannels to represent a data zone, and the LTE system uses a bitmap to represent the data zone.

A method for mapping data to the resource zone is as follows. Data is divided into several segments, each of which has the size appropriate for one OFDMA RB. Subsequently, respective RBs may be formed with a span of subcarriers (e.g., one subchannel) corresponding to one RB on a frequency axis and a span corresponding to at least one OFDMA symbol on a time axis.

In this case, the lowest-numbered RB is mapped to the lowest-numbered OFDMA symbol and the lowest-numbered subchannel. In this way, this mapping operation can be continued while an OFDMA subchannel index of the frequency axis increases. If the mapping position reaches the end of the data zone, the above-mentioned mapping operation is continued from the lowest-numbered subchannel of the next available OFDMA symbol.

Figure 11:
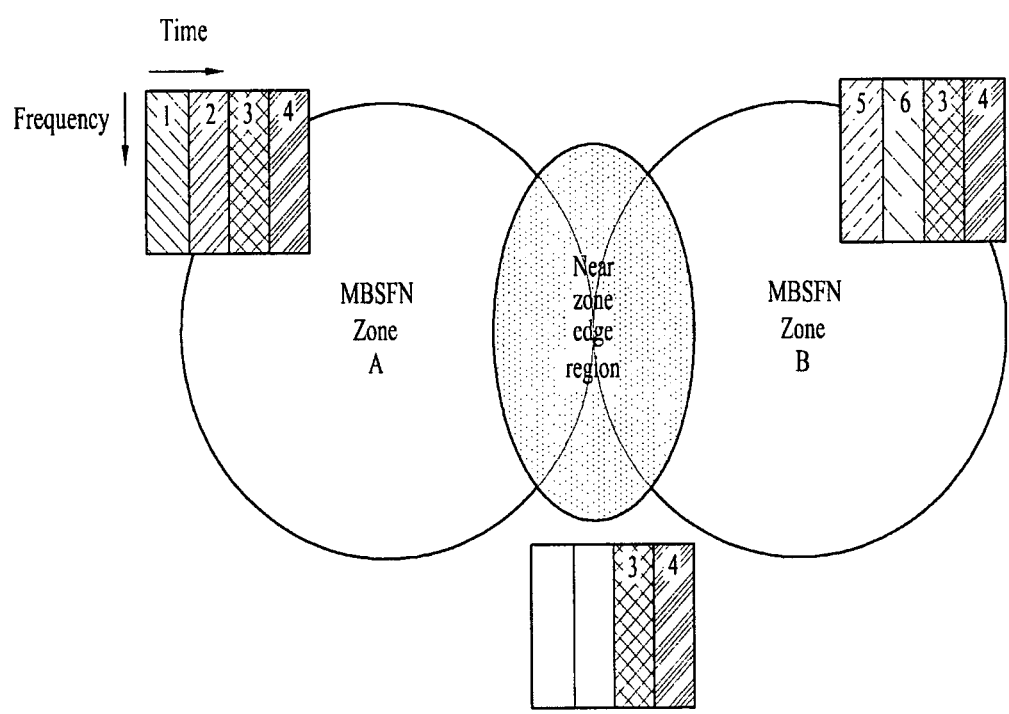
FIG. 11 is a conceptual diagram illustrating a method for providing MBS data according to still another embodiment of the present invention.

FIG. 11 is a conceptual diagram illustrating a method for providing MBS data according to still another embodiment of the present invention.

FIG. 11 illustrates a method for reducing a performance deterioration caused by interference generated from the edge of MBSFN zones providing different services. The multicast and broadcast service (MBS) can be provided by MBS subchannelization according to the TDM scheme. That is, the resource zone is firstly allocated to a frequency axis, such that the TDM scheme for each service can be used. Accordingly, an amount of wasted radio resources is minimized by the TDM scheme, and performance deterioration at the MBSFN zone edge is minimized, such that an MBS performance of all MBSFN zones can be improved.

Different MBSFN zones provide mobile stations of their own zones with one or more MBSs. In this case, respective MBSFN zones may be adjacent to each other. Also, respective MBSFN zones may provide the same MBS as those of other MBSFN zones, or may also provide different MBSs.

Cells contained in the MBSFN zone edge (i.e., 'near zone edge region' in FIG. 11) may optionally provide mobile stations with the MBS using the TDM scheme for each service. For example, if the mobile station is located at the edge between a specific MBSFN zone and another neighbor MBSFN zone, this specific MBSFN zone can provide the mobile station with only the same MBS between its own MBS and another MBS provided from another neighbor MBSFN zone. Also, cells located at the MBSFN zone edge (i.e., the near zone edge region) may not provide the mobile station with the MBS applied to only the specific MBSFN zone. As a result, interference between different MBSFN zones can be prevented.

In more detail, cells located at the near zone edge region may not provide all MBSs provided from the specific MBSFN zone, but may transmit only the same MBS data among the above MBSs of the specific MBSFN zone and other MBSs provided from neighbor MBSFN zones to the mobile station. Therefore, cells located at the near zone edge region can prevent interference from the neighbor MBSFN zone, simultaneously while achieving performance improvement.

Referring to FIG. 11, two neighboring MBSFN zones A and B are shown. In this case, it is assumed that the edge between the first MBSFN zone A (MBSFN Zone A) and the second MBSFN zone (MBSFN Zone B) is a near zone edge region. It is assumed that the first MBSFN zone A provides MBSs 1~4 and the second MBSFN zone B provides other MBSs 3~6. Individual MBSs can be provided by the TDM scheme.

Data of only the MBSs 3 and 4 simultaneously provided from the first and second MBSFN zones A and B is transferred to cells contained in the edge (i.e., near zone edge region) among respective MBSFN zones. However, the MBSs 1 and 2 of the MBSFN zone A are different from the MBSs 5 and 6 of the MBSFN zone B. Therefore, cells located at the edge between the MBSFN zones A and B may not provide mobile stations with MBS data of the MBSs 1, 2, 5 and 6.

In this case, the MBSFN zones A and B do not provide not only data but also pilot information. In addition, temporal locations (i.e., timings) of the MBSs 3 and 4 simultaneously provided from the two MBSFN zones A and B should be equal to each other. Also, the interference generated from the near zone edge region is solved such that high-quality services can be provided to all MBSFN zones.

Figure 12:
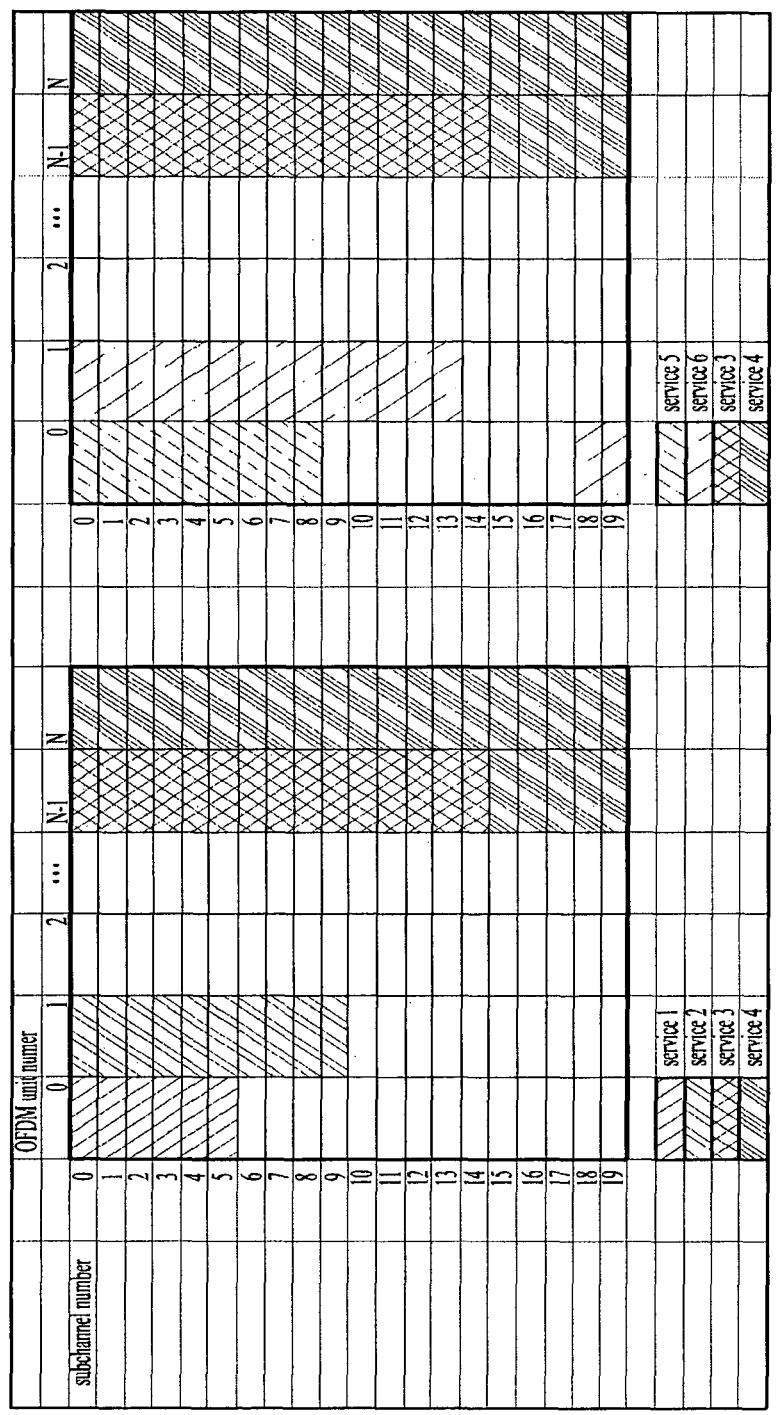
FIG. 12 is a conceptual diagram illustrating an exemplary MBS resource allocation method according to a yet another embodiment of the present invention.

FIG. 12 is a conceptual diagram illustrating an exemplary MBS resource allocation method according to still another embodiment of the present invention.

FIG. 12 illustrates an example of a method for allocating an MBS resource zone. Particularly, FIG. 12 shows an application example of the MBS allocation method proposed by FIG. 11. As can be seen from FIG. 12, Services 3 and 4 may use the same permutation, whereas different permutations are applied to Services 1 and 2 (Services 1 and 2) and other Services 5 and 6 (Services 5 and 6).

The reason why the embodiments of the present invention prefer to use the TDM method among various multiplexing methods is that the TDM method is able to use different permutations for individual services. For example, if the MBS is a partial loading, and different permutations are applied to different services or different OFDM symbols of each zone as shown in FIG. 11 or 12, the probability of generating a collision between different services is greatly reduced, such that the TDM method can reduce the interference more largely than in the FDM method.

It will be apparent to those skilled in the art that various modifications and variations can be made in the present invention without departing from the spirit or scope of the invention. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

MODE FOR INVENTION

Various embodiments have been described in the best mode for carrying out the invention.

INDUSTRIAL APPLICABILITY

As apparent from the above description, the present invention provides following effects. First, the present invention can effectively provide mobile stations with MBS data. Second, the present invention uses the resource allocation method for the MBS, in particular, it allocates MBS data according to the TDM scheme, such that it can avoid generating an interference caused by the MBS provided from another MBSFN zone. Third, the present invention may selectively transmit MBS data to mobile stations located at an edge of the MBSFN zone, such that it can prevent interference from a neighbor MBSFN zone and can also prevent performance deterioration caused by this interference.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A multicast and broadcast service (MBS) data transmission method for use in a multicast broadcast single frequency network (MBSFN) zone, the method comprising:
   constructing a resource region in a downlink subframe for transmitting the MBS data by sequentially allocating predetermined resource blocks to the resource region according to a frequency axis and a time axis;
   dividing the MBS data into one or more segments which has the size of a predetermined resource block;
   mapping the divided MBS data to each of the resource blocks of the resource region; and
   transmitting a first MBS data among the mapped MBS data to mobile stations located at an edge of the MBSFN zone, when a mobile station is within a common area between an edge of the MBSFN zone and an edge of a neighbor MBSFN zone,
   wherein the resource blocks are sequentially allocated to the resource region according to the frequency axis, and then are repeatedly allocated to the resource region according to the time axis,
   wherein a second MBS data, which is among MBS data provided from the neighbor MBSFN zone, and the first MBS data are the same,
   wherein the first MBS data and the second MBS data are transmitted to the same time zone according to a time division multiplexing (TDM) method by using a same method for allocating the resource region, and
   wherein the divided MBS data are mapped to the resource region using a symbol offset value and predetermined consecutive resource blocks.

2. The MBS transmission method according to claim 1, wherein different MBS data among MBS data provided from the MBSFN zone and other MBS data provided from the neighbor MBSFN zone are selectively provided to the mobile stations.

3. The MBS transmission method according to claim 1, wherein different MBS data among MBS data provided from the MBSFN zone and other MBS data provided from the neighbor MBSFN zone are not provided to the mobile stations.

4. The MBS transmission method according to claim 1, wherein the divided MBS data are sequentially mapped to the resource region using predetermined consecutive resource blocks.

5. The MBS transmission method according to claim 1, wherein the first MBS data and the second MBS data are provided to the mobile stations using a same symbol offset value.

6. The MBS transmission method according to claim 1, wherein the divided MBS data are mapped to the resource region using different methods for allocating the resource region for individual MBS data.

7. The MBS transmission method according to claim 1, wherein the divided MBS data are mapped to the resource region using different method for allocating the resource region in units of a symbol area.

8. The MBS transmission method according to claim 1, wherein the divided MBS data are mapped to the resource region using the time division multiplexing (TDM) method.

9. The MBS transmission method according to claim 8, wherein the same MBS data among the MBS data provided from the MBSFN zone and other MBS data provided from the neighbor MBSFN zone are allocated to a same time zone respectively.

10. A multicast and broadcast service (MBS) data transmission method for use in a multicast broadcast single frequency network (MBSFN) zone, the method comprising:
   constructing a resource region in a downlink subframe for transmitting the MBS data by sequentially allocating predetermined resource blocks to the resource region according to a frequency axis and a time axis;
   dividing the MBS data into one or more segments which has the size of a predetermined resource block;
   mapping the divided MBS data to each of the resource blocks of the resource region; and
   transmitting a first MBS data among the mapped MBS data to mobile stations located at an edge of the MBSFN zone, when a mobile station is within a common area between an edge of the MBSFN zone and an edge of a neighbor MBSFN zone,
   wherein the resource blocks are sequentially allocated to the resource region according to the frequency axis, and then are repeatedly allocated to the resource region according to the time axis,
   wherein a second MBS data, which is among MBS data provided from the neighbor MBSFN zone, and the first MBS data are the same,
   wherein the first MBS data and the second MBS data are transmitted to the same time zone according to a time division multiplexing (TDM) method by using a same method for allocating the resource region, and
   wherein the first MBS data and the second MBS data are provided to the mobile stations using a same symbol offset value.

11. The MBS transmission method according to claim 10, wherein different MBS data among MBS data provided from the MBSFN zone and other MBS data provided from the neighbor MBSFN zone are selectively provided to the mobile stations.

12. The MBS transmission method according to claim 10, wherein different MBS data among MBS data provided from the MBSFN zone and other MBS data provided from the neighbor MBSFN zone are not provided to the mobile stations.

13. The MBS transmission method according to claim 10, wherein the divided MBS data are sequentially mapped to the resource region using predetermined consecutive resource blocks.

14. The MBS transmission method according to claim 10, wherein the divided MBS data are mapped to the resource region using different methods for allocating the resource region for individual MBS data.

15. The MBS transmission method according to claim 10, wherein the divided MBS data are mapped to the resource region using different method for allocating the resource region in units of a symbol area.

16. The MBS transmission method according to claim 10, wherein the divided MBS data are mapped to the resource region using the time division multiplexing (TDM) method.

17. The MBS transmission method according to claim 16, wherein the same MBS data among the MBS data provided from the MBSFN zone and other MBS data provided from the neighbor MBSFN zone are allocated to a same time zone respectively.

* * * * *